(12) United States Patent
Hedrick et al.

(10) Patent No.: US 6,242,139 B1
(45) Date of Patent: Jun. 5, 2001

(54) COLOR FILTER FOR TFT DISPLAYS

(75) Inventors: Jeffrey Curtis Hedrick, Park Ridge, NJ (US); David Andrew Lewis, Carmel; Stanley Joseph Whitehair, Peekskill, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/122,277

(22) Filed: Jul. 24, 1998

(51) Int. Cl.[7] ............................. G02B 5/20; G02F 1/1335
(52) U.S. Cl. .................................. 430/7; 359/891
(58) Field of Search ................. 430/7; 349/106; 359/891

(56) References Cited

U.S. PATENT DOCUMENTS 5,691,011 * 11/1997 Newsham et al. ..................... 428/1
6,042,974 * 3/2000 Iwata et al. ............................ 430/7

FOREIGN PATENT DOCUMENTS

| 61-245106 | * 10/1986 | (JP) . |
| 4-086801 | * 3/1992 | (JP) . |
| 4-121702 | * 4/1992 | (JP) . |

* cited by examiner

Primary Examiner—John McPherson
(74) Attorney, Agent, or Firm—Thomas A. Beck; Daniel P. Morris

(57) ABSTRACT

A means to fabricate a color filter for use in a display, such as a liquid crystal display, in which a physical barrier is created which prevents the flow of a liquid dye after application and ensures that individual cells are filled with only the desired color. Additionally, a means is disclosed which creates a surface with all colors initially present, followed by an exposure means and a development means which enables the desired color to fill the desired cell.

1 Claim, 3 Drawing Sheets

COLOR FILTER FOR TFT DISPLAYS

BACKGROUND OF THE INVENTION

1. Field of Invention

This invention relates to an improved method of manufacture of color filters suitable for such uses as flat panel displays.

2. Description of Related Art

Liquid Crystal Displays (LCD) have been used for many years in place of cathode ray tubes (CRT) screens for small and large sized displays. However, LCD usage has been limited to high cost applications (such as expensive laptop computers) due to the high cost of fabrication. Recent improvements have permitted development of large size, high resolution displays which are useful in notebook and desktop computers. Such LCD panels, particularly color LCD panels, are used for flat screen televisions, projection television systems and camcorder view finders, with many more applications anticipated in the future. Such display panels may take two forms: passive matrix and active matrix liquid crystal displays (AMLCDs). Passive matrix displays employ transparent electrodes patterned in perpendicular striped arrays on facing glass plates, that is superimposed one on the other. Red, green and blue color filters on the inner surface of one of the glass plates provide the full color display. The passive matrix display is ostensibly easier to fabricate than AMLCDs, but is much more limited in performance capabilities.

One of the challenges to reducing the cost of fabricating thin film transistor (TFT), also known as an active matrix, displays is the color filter, which can cost up to 25% of the total LCD cost. In these devices, white light passes through a light valve (the TFT LCD) which adjusts the intensity of the light and then the intensity adjusted light passes through a color filter to give the desired color. A pixel is made up of three colors (each with an independent light valve) corresponding to the primary colors. Accordingly, white color results when the filters are full on; and black color results when all of the filters are full off. The resolution and alignment of the color filter must be such that the filter overlays the TFT devices exactly and provide a very clean differentiation between colors of the mask. Furthermore, the color of the elements in the filter must be consistent from one filter to another and be within a narrow color tolerance. Other types of displays, such as plasma filters, can use the color filter embodied in the present invention.

The fabrication of an active matrix liquid crystal display involves several steps. The assembly comprises two glass panels, identified as front and rear panels. In the first step, the front glass panel is prepared, which involves deposition of a color filter element onto a suitable substrate, such as glass. Color filter deposition typically involves depositing a black matrix pattern and three primary (red, green and blue) color patterns within the spaces outlined by the black matrix. The color elements are each typically about 70 to 100 microns in width by 200 to 300 microns in length. These dimensions are typically used for notebook computer applications. The front glass substrate is completed by deposition of a transparent conducting layer over the color filter element.

Although the present invention also is suitable for use in passive liquid crystal displays, it will be described in embodiments of an active display and specifically a thin film transistor (TFT) liquid crystal display. As partially shown in FIG. 1, a conventional TFT display 10 comprises an array of cells or pixels A, each cell including a thin film transistor 11 to address the cell by applying a voltage to the cell when the transistor is in its on state and a capacitor 12 which maintains the voltage after the transistor is switched off. The transistor is formed on a glass substrate 13 on the back side of the display 10 and is connected between a column or data electrode 14 and a row electrode 15 and to a display transparent electrode 16 of each pixel, all at the back side of the display 10. The front side of the display 10 is formed with a continuous common transparent electrode 17 which is spaced apart from and positioned parallel to the transparent display electrode. Both the common electrode 17 and the display electrode 16 are preferably formed of a thin transparent conductive material, such as indium tin oxide (ITO), carried on a glass substrate. Since the display electrode of each pixel is smaller in dimensions than the continuous common electrode, a fringe field results which spreads outward from the pixel or cell edges of the display electrode to the common electrode when voltage is applied across the electrodes. Parallel with the outside of the common electrode 17 and adjacent glass substrate 18 is a polarizer 19, which is appropriately orientated relative the a polarizer 20 mounted in back of the rear glass substrate 13. Alignment layers 21 and 22 are disposed on the inner surface of the display and common electrodes 16 and 17, respectively, and are in contact with a liquid crystal layer 23, herein twisted nematic liquid crystal molecules with a positive dielectric anisotropy, which is sealed between the two parallel mounted glass substrates carrying the alignment layers 21 and 22. On the back side of the display 10 is a visible light source (not shown) which irradiates the display 10 through a diffuser 24. If it is desired to have the display 10 in color, a color filter 25 is disposed adjacent the non-alignment layer side of the common electrode 17, and contains groups of the three primary colors (red, green, and blue), each one of the primary colors being associated with one of a group of three adjacent pixels A to form a color cell.

To illustrate the environment of the present invention in more detail, FIG. 2 shows an enlarged cross-section of the layers of a single domain cell or pixel (prior art) of the liquid crystal display taken along line 1—1 of FIG. 1. with switch 26 (representing the TFT in each pixel) open and a voltage is not applied across the liquid crystal layer 23. In this illustration, the liquid crystal layer comprises twisted nematic liquid crystals with a left-handed twist which is conventionally achieved by using chiral additives. FIG. 2 diagrammatically shows this LC layer 23 as elongated molecules 28a, 28b, 28c, 28d, 28e, 28f, 28g, 28h, 28i, 28j, 28k, and 28l with molecules 28a, 28b, 28c, and 28d being in contact with surface 29 of the front alignment layer 22 and molecules 28i, 28j, 28k, and 28l being in contact with surface 30 of the rear or back alignment layer 21. Molecules 28a–d and molecules 28i–l are tilted longitudinally away from their respective surfaces 29, 30 by the same angle a0. Because of the twist angle of the LC molecules, the molecules along the surfaces 29 and 30 are drawn going into and out of the plane of the paper. The bulk molecules, as depicted by 28e–28h, are drawn longer since they are oriented more parallel to the plane of the paper. Surface 29 of the front alignment layer 22 is disposed adjacent the transparent electrode 17, the color filter 25, which is optional, the glass substrate 18, and the polarizer 19 in that order. Surface 30 of the rear alignment layer 21 is disposed adjacent the transparent electrode 16, and the glass substrate 13, the polarizer 20, and the diffuser 24 in that order. The light on the back side of the diffuser 24 for irradiating the liquid crystal display panel is not shown. When switch 26 is closed as shown by the dashed line 26a and voltage is applied, the molecules 28*a–d* and 28*i–l* on alignment surfaces 29 and 30 which are influenced by the same pre-tilt angle a0 cause the bulk molecules, as shown by the center molecules 28*e–h*, to move in the direction as shown by the dashed arrows 31.

In a second step, a separate (rear) glass panel is used for the formation of thin film transistors or diodes, as well as metal interconnect lines. Each transistor acts as an on-off switch for an individual color pixel in the display panel.

The third and final step is the assembly of the front and rear panels, including injection of a liquid crystal material between the two panels to form the liquid crystal cell.

Ideally, in LCD displays, the transparent conducting layer, which typically is indium tin oxide (ITO), should be as smooth as possible to ensure electrical continuity. In addition, any thickness variations in the glass substrates or coatings can result in visible defects in the final display. Consequently, it is also important that the liquid crystal layer that fills the gap between the front and back panels be as uniform as possible across the entire display.

Because the glass substrate which forms the front panel is itself a relatively flat article having parallel sides, any variations in thickness usually occur as a result of the process used to deposit the color filter array. It is therefore desirable to deposit color filter patterns which have a smooth upper surface and as uniform a thickness as is possible, because once a uniform thickness color filter/substrate composite has been obtained, it is a relatively straight forward process to deposit a smooth ITO layer and obtain a uniform cell gap when the front panel is combined with the rear panel.

For this reason, photolithographic techniques are now preferred over printing techniques for forming color filters, because photolithography is capable of forming uniform color arrays. Nonetheless, all the deposition methods used thus far, including photolithography, by themselves have not been capable of depositing sufficiently smooth color patterns. Consequently, a planarizing layer is commonly applied over the color patterns to alleviate any imperfections in coating smoothness or thickness uniformity due to the deposition process. The transparent planarizing layer also serves to protect against ion migration to or from the ITO layer and color pattern layer. The planarizing layer should also be as smooth and flat as possible.

To facilitate deposition of the flat planarizing layer noted above, it is desirable that the color patterns be as smooth, flat and substantially parallel to the undersurface of the glass substrate. Also, color patterns of uniform cross-section are desirable for obtaining optimum display contrast and color performance, because if the thickness of the pattern varies, the transmitted light intensity will vary.

One method heretofore used to form color filters is photolithography, in which each color pattern in the color filter is deposited in a separate step. As mentioned above, photolithography has, in the past, been a preferred method of depositing color filters, especially when compared to ink printing methods such as waterless lithography, gravure and typography. Photolithography is preferred because it deposits image dots having a more flattened, rectangular cross-section.

The printed ink dot, on the other hand, typically has a more round-topped or triangular cross-section due to surface tension effects. In addition, in typical printing processes, because the ink tends to wet both surfaces during a transfer from roll to roll or from roll to substrate, the inks tend to split cohesively to some extent during such transfers. This may further contribute to non-uniformity of the ink dot thickness, particularly for high viscosity inks. This results in an ink dot which, when deposited onto a substrate and cured, has a non-uniform cross-sectional shape, and this in turn results in an uneven surface which is more difficult to alleviate using a planarizing layer.

In addition, photolithographic printing methods are inherently more accurately registered because the alignment between different color patterns is accomplished by optical rather than mechanical methods, and optical methods are intrinsically more precise. For all of these reasons, various prior workers in the flat panel display art have concluded that printing methods are substantially inferior for making color filters for LCD panels.

For example, the authors of *Color Filter for Liquid Crystal Display* by Ueyama et al, SEMI-SEMICON/West 92, International Flat Panel Display Conference, Section B, Pages 41–59, explain that, while printing methods are less expensive, the accuracy of ink printing methods is not sufficiently reliable to make high quality color filter components. The article points out, as also mentioned hereinabove, that printing methods are thought to be quite inferior in quality compared to photolithography, primarily because of the rounded cross-sectional shape of printed dots.

K. Mizuno and S. Okazaki, in *The Japanese Journal Of Applied Physics*, Vol. 30, No. 118, November, 1991, pp. 3313–3317, proposed producing a color filter by a process wherein ink patterns are successively prepared on a transfer (offset) roll and cured by exposure to ultraviolet light (UV) prior to transfer to the substrate. Each cured ink color pattern is individually transferred to a glass substrate coated with an adhesive layer.

U.S. Pat. No. 4,445,432 discloses a method and apparatus, relevant to a different art, for applying thermoplastic decorative inks onto various substrates by printing each color ink onto a releasing surface from a heated engraved or etched metal surface, transferring the various colors from each releasing surface onto a second releasing collector surface to form a multi-colored print, and transferring the multi-colored print to a ceramic, glass-ceramic or glass substrate. Various color inks are successively printed onto a collector roll, after which the resultant pattern is transferred to the substrate. Such processes have not been used to make color filter patterns.

U.S. Pat. No. 4,549,928 (Blanding et al.) describes using a similar technique for printing phosphors and a black matrix onto color TV panels. In this operation, thermoplastic pressure-sensitive inks, corresponding to the red, green and blue color phosphors and the black matrix, are applied separately to the collector roll to form the desired pattern. This pattern is then transferred to the TV tube panel.

Unfortunately, all of the techniques described above result in the ink dots having the conventional rounded or triangular cross section. It would be desirable to develop a method which results in smoother, more uniform ink dot shapes which are more suitable for color filter array applications.

In addition, color filter arrays typically undergo rather severe potentially destructive heating and treatment steps during manufacture of the LCD display. For example, the transparent conducting layer, typically indium tin oxide (ITO), is usually vacuum sputtered over the color filter array panel. This commonly takes place at temperatures elevated as high as 250_C., for times which may be as long as one hour or more. Also, the liquid crystal is assembled by laminating the front and rear glass panels under pressure with thermally curable adhesives, which typically require temperatures in excess of 200_C. Not all materials can withstand such high temperatures.

SUMMARY OF THE INVENTION

A principal object of the current invention is to fabricate a color filter for use in a liquid crystal or similar display by providing a means to successfully use an ink-jet printing system to deposit colored inks in a predetermined position by using a physical barrier to prevent flow of the ink from the designated cell to which it is delivered.

It is another object of the present invention to fabricate a color filter for use in displays by the application of a substantially uniform coating over the entire surface of a substrate and selectively exposing predetermined areas to produce the desired color automatically.

It is a further object of this invention to fabricate a color filter by selectively exposing certain glass spheres containing a dye, a resin and a photosensitive initiator, which are randomly distributed across a surface of a substrate, applying pressure to crush certain selected glass spheres releasing a dye to form a colored cell filled with the desired color.

Other objects and features as well as additional details of the present invention will become apparent from the following detailed description and annexed drawings of the presently preferred embodiments thereof, when considered in conjunction with the associated drawings.

DETAILED DESCRIPTION OF THE INVENTION

Figure 1:
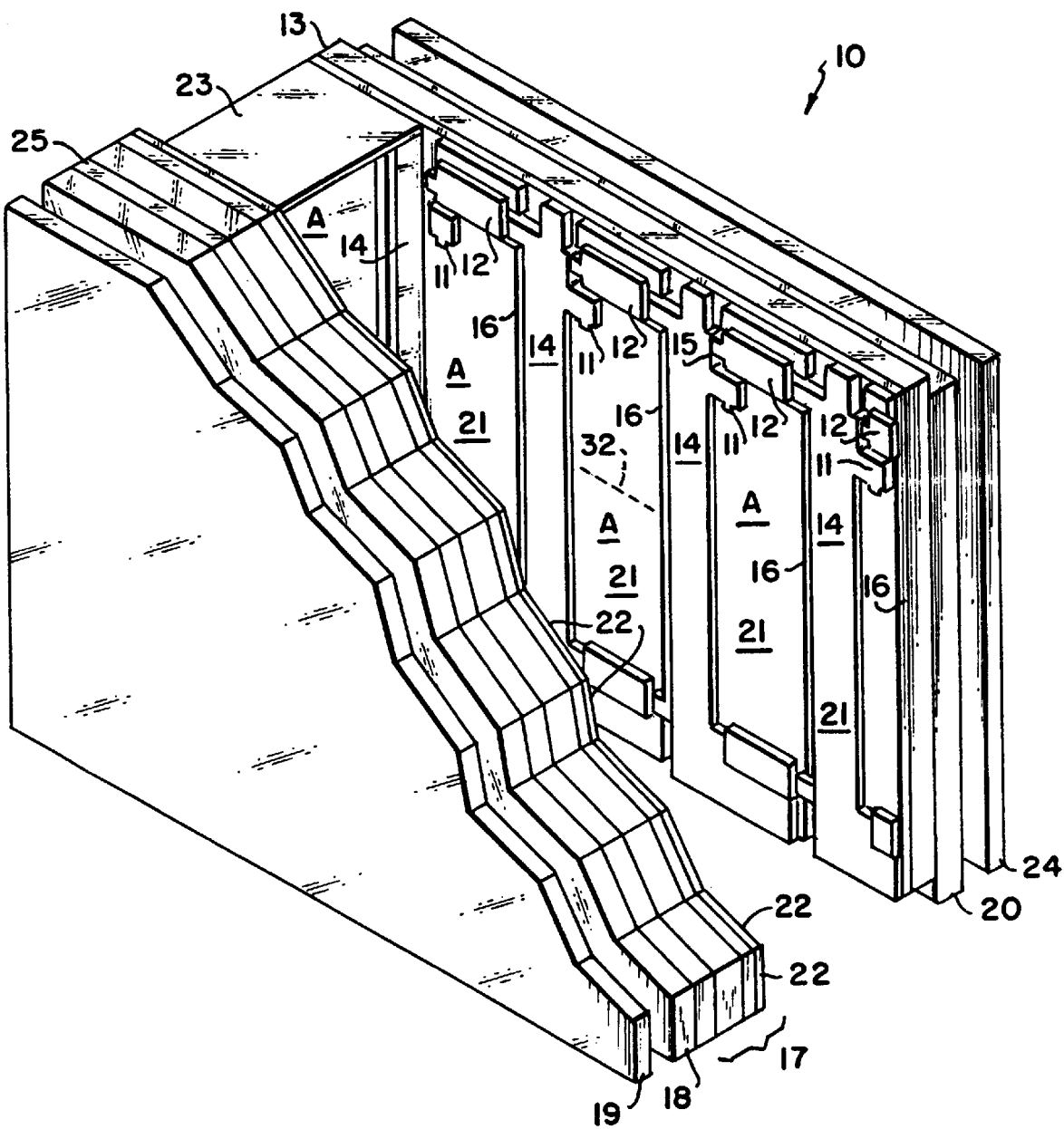
FIG. 1 is an orthogonal view of a single pixel in a liquid crystal display.
Figure 2:
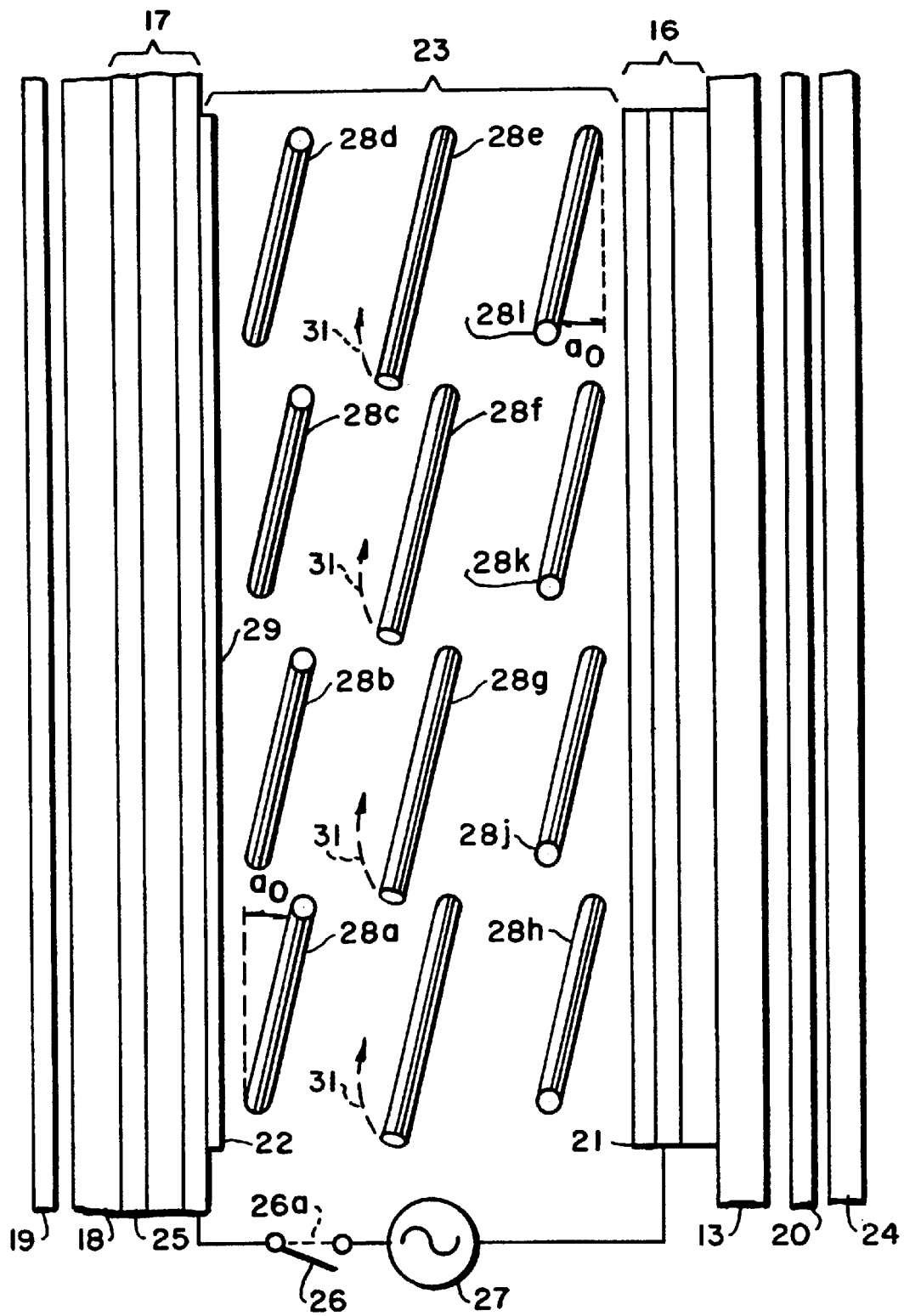
FIG. 2 is a cross-sectional view of liquid crystal display.

From a cost perspective, in the first order, the more manufacturing steps required to make a product, the more expensive it becomes (due to sequential yield decreases, time, handling, etc). Hence, it is highly desirable to eliminate the current method of sequential photolithographic techniques.

However, as described above, while a form of printing is extremely attractive, it is also impractical due to challenges associated with obtaining the correct shaped pixels (avoiding rounded or triangular cross-section ink depositions on the color filter).

The present invention relates to a color filter suitable for use in a display wherein said filter comprises a plurality of defined cells. Each cell is of predetermined color, made up of an admixture of a dye, glass fragments and a matrix material having a thickness, and wherein said plurality of cells are separated from one another by a barrier, said barrier being at least equal to or higher than the thickness of said admixture, or both.

The present invention overcomes the problems associated with printing in the step of transferring colors to the correct cells to provide blanket coverage and through an exposure step only "uncover" the colors desired in the specific cells. This novel approach is a substantial improvement over other methods for fabricating color filters.

The preferred embodiments of the present invention comprise several useful novel methods of fabricating a color filter as follows:

(i) the first embodiment comprises a method of fabricating a color filter based on the principles of color photographic film to produce the desired color density, etc. which is imaged by a single exposure using a "master" filter mask.

(ii) the second embodiment comprises a method of using physical dams to contain colored resin delivered by an inkjet-like process or a colored thermoplastic. While the delivery of color is akin to a photocopy process, the physical dams control the flow of the color (a problem with a conventional photocopy approach), thereby preventing overflow in adjoining cells and maintaining clean, sharp edges.

(iii) the third embodiment comprises a method of using glass spheres containing a curable resin, dyes and an initiator suitable to the particular dye in the glass sphere to only expose the desired color in a receptacle or dam, created by a prior lithographic step.

The present invention is more fully illustrated by referring to the following examples of the preferred embodiments of the invention as follows.

EXAMPLE 1

Photography film (the negative) is currently manufactured by applying a series of several discrete layers of silver halide with a dye on a polymer film—typically polyethylene terephthalate (PET) or cellulosetriacetate. These layers contain the three primary colors necessary to make up white light. After exposure, depending on the number of photons of each color, the silver halide is permanently changed, resulting in variations of the concentration of each dye after development thereby producing a photographic image.

The method of making a color filter suitable for use in a display involved in this Example 1 comprises depositing on a substrate that is sensitive to light, in sequence, an antihalation layer, a first gelatin interlayer, a red-sensitive silver halide emulsion layer, a second gelatin interlayer, a green-sensitive silver halide emulsion layer, a blue absorbing interlayer, a blue-sensitive silver halide emulsion layer, and a clear gelatin overcoat, said layers forming a laminate structure and forming colors comprising said color filter, exposing said laminate structure through a mask with actinic radiation to form a predetermined spatial pattern, contacting said laminate structure with a developer, contacting said laminate structure with a fixing agent. The structure and method of forming a typical cross section of a color-photographic as noted above, is described in detail in the Kirk-Othmer Encyclopedia of Chemical Technology, (Third Edition), Volume 6, in the section called "Color Photography," pages 617 to 682, (John Wiley & Sons, New York), the contents of which are hereby incorporated by reference herein.

To form a color filter for a display, it is desirable to expose all three colors and black simultaneously and thereby save a number of manufacturing steps. However, in a color filter, the intensity of each color is predetermined and controlled (rather than variable like a photograph) and only the spatial positioning of each color is of importance. Hence, it is desirable to "fully saturate" the color. The concentration of dye is therefore reduced compared to the concentration used in color photography to provide the desired color balance with the remaining primary colors. When such a modified color film is exposed to light passed through a __master__ color filter, all three primary colors are exposed simultaneously in addition to the black matrix. This alleviates the need for alignment of each successive exposure (although such a means could be practiced using alignment methods currently utilized).

After exposure, the film is exposed to a developer solution in an analogous manner to color photography.

By the colors being fully saturated through control of the concentration of dye in the film initially, the requirement of preventing further "development" of the color through exposure to light during the operating lifetime of the LCD is simultaneously alleviated.

The color filter formed by this method could be manufactured either on a flexible polymeric film, such as PET or cellulosetriacetate or on a very thin glass sheet.

EXAMPLE 2

As described above, one of the challenges of using printers to deposit inks in the formation of a color filter is the "rounding" of corners and the cross-section profile due to surface tension effects from the substrate surface. Although colored inks can be deposited in a very precise manner by an in-jet process or through a photocopy-like process where either colored thermoplastic or wax is delivered onto the substrate (since the resolution of these devices is greater than the requirements for a color filter), two things can happen—an ink wets the medium it is place on and increases in size, thereby blending with neighboring dots; or the polycarbonate flows during the fusing step and also spreads out, blending with neighboring dots. In fact, this is the desired effect for all printing processes, thereby ensuring that a background is fully saturated with color and that there is a good progression from one color dot to the next to make a smooth transition in color. This is, however, counter to the goals in fabricating a color filter, where the colors must remain separated and pure, with sharp transitions between each color and the black matrix.

The result of the spreading of the dots is that colors become mixed and the filer no longer retains as pure a color at a particular location and secondly, the differentiation between pixels and colors becomes very ragged, resulting in poor color differentiation and therefore a poor color filter.

By using a lithographic step or a high resolution printing step to place a raised black mask onto a glass or polymeric sheet, a dam can in effect be formed to contain the ink or toner. The color filter is then "printed" using an inkjet or laser printer mechanism. Using a process such as this, only one lithographic step is required which provides the alignment marks, etc. and also acts to prevent the mixing of colors to ensure a pure color and very clean distinction between colors. It is important that for this process to work effectively, the thickness of the black matrix (mask) must be significantly thicker than is found in current LCD's.

Finally, it is important to note that this invention will be effective for future pixel sizes for LCD's.

A physical barrier can mean any means to prevent the motion of a liquid and can include a dam, a surface wetting phenomena, etc.

EXAMPLE 3

In this example, a physical barrier is created through a lithographic step or other process.

Mead Corporation has disclosed in a number of patents listed below, a photocopying process which comprises a substrate (e.g. paper) with a developer solution on it and glass balls which were filled with a dye precursor, an absorber of a complimentary color and a monomeric resin—typically methylmethacrylate. There were 3 different types of balls (one for each primary color). If light of the correct color, say green, struck a ball with green absorber in it, there was a photochemical reaction to cure the MMA to poly (methylmethacrylate). After the exposure was complete, the substrate with the balls was passed through a device to apply pressure and break the unexposed balls (the exposed and cured balls would not break under this pressure), whereupon the resin and dye from the unexposed balls would mix with the developer solution and cause the dye to become colored (e.g., electron attachment reaction). This would be the final positive image. After the process was complete, on the surface of the substrate would be the cured (fixed) resin, dye, remains of the broken glass balls and exposed, hard, colorless glass balls. The ball size is approx. 1 to 25 microns in diameter. The methods for forming a color photocopy are disclosed in U.S. Pat. Nos. 4,440,846, 4,701,397, and 5,309,196; and a system for recording an image is disclosed in U.S. Pat. No. 5,049,902; and the method of making the microcapsules is disclosed in U.S. Pat. No. 5,283,015. The contents of these references is hereby incorporated by reference herein.

To produce an imaging sheet capable of providing images, the inventive photosensitive microcapsules are coated onto a substrate.

The most common substrate for imaging sheets in accordance with this invention is a transparent film or glass. Transparent substrates such as polyethylene terephthalate.

To form an image, the inventive substrate is exposed to actinic radiation such that the microcapsules are image-wise exposed. Typically, exposure of the microcapsules to actinic radiation (ultraviolet, visible or infrared wavelengths) causes the internal phase of the microcapsules to polymerize, thereby preventing escape of the image-forming agent from the imaging sheet. Thereafter, the microcapsules on the imaging sheet are subjected to a uniform rupturing force in the presence of a developer material to form the images.

When the image-forming agent is a colorless color-forming agent, it is necessary that the developer sheet include a developer material which is capable of reacting with the color-forming agent to form an image. Illustrative examples of color developers useful in conjunction with the embodiment employing the aforesaid color precursors are clay minerals such as acid clay, active clay, attapulgite, etc.; organic acids such as tannic acid, gallic acid, propyl gallate, etc.; acid polymers such as phenol-formaldehyde resins, phenol acetylene condensation resins, condensates between an organic carboxylic acid having at least one hydroxy group and formaldehyde, etc.; metal salts or aromatic carboxylic acids such as zinc salicylate, tin salicylate, zinc 2-hydroxynaphthoate, zinc 3,5-di-tert-butyl salicylate, oil soluble metal salts or phenol-formaldehyde novolak resins (e.g., see U.S. Pat. Nos. 3,672,935; 3,732,120 and 3,737,410) such as zinc modified oil soluble phenol-formaldehyde resin as disclosed in U.S. Pat. No. 3,732,120 zinc carbonate etc. and mixtures thereof. A preferred class of glossable developers is described in commonly assigned U.S. application Ser. No. 073,036, filed Jul. 14, 1987, now U.S. Pat. No. 4,859,561.

Full-color imaging systems are described in U.S. Pat. No. 4,576,891, European Published Application No. 0223587 and U.K. Patent No. 2,113,860. These systems employ imaging sheets having three sets of microcapsules which respectively contain cyan, magenta and yellow color precursors. As explained in more detail in the above-listed references, each set of microcapsules is primarily sensitive in a different wavelength band such that the microcapsules can be individually exposed with minimum cross-talk. In panchromatic systems, the cyan, magenta, and yellow forming photosensitive microcapsules are respectively sensitive to red, green and blue light.

To produce full-color images, each set of microcapsules is image-wise exposed to actinic radiation. This requires exposures of three different wavelengths, each wavelength corresponding to the sensitivity of the photohardenable composition selected for the corresponding set of microcapsules. The three different wavelengths may be provided from one broad band radiation source or three independent monochromatic radiation sources.

When used in photographic imaging systems, the microcapsules of the present invention afford a number of advantages. First, the reaction time of the cyanoacrylate or isocyanatoacrylate prewall reactant with water from the aqueous phase to form a thick prewall is shortened. In the case where a cyanoacrylate prewall reactant is used, its prewall formation is not a diffusion-controlled reaction, but rather, an ionic polymerization. It is hypothesized that ionic polymerization, as opposed to diffusion controlled polycondensation, enables chain propagation through the interface and rapid formation of a thick prewall to occur. This improves the rate of production of the microcapsules and makes their production more feasible from a commercial standpoint. Further, the amount of residual isocyanate after reaction is maintained at a minimum. As discussed above, this results in a better shelf life and image quality for the microcapsules.

Because the monomer is a liquid, it will flow under the stress of breaking the balls unless there is a physical dam to prevent this flow. The substrate should be either a transparent polymer or glass.

For a single color pixel of about 254×84 microns, it can be seen that if approx. 5 micron diameter balls were used, there would be a total of approximately 750 balls in a single cell (comprising all three colors), providing an average of 250 balls of each color in each cell which is an adequate number of each color glass balls that a uniform color filter can be obtained.

Figure 3:
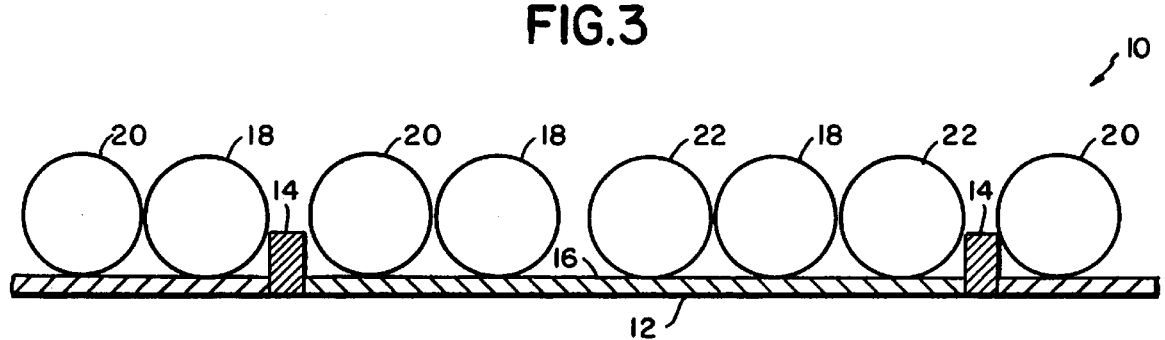
FIG. 3 is a schematic showing a sideview of microcapsules distributed on a surface constrained by a barrier.
Figure 4:
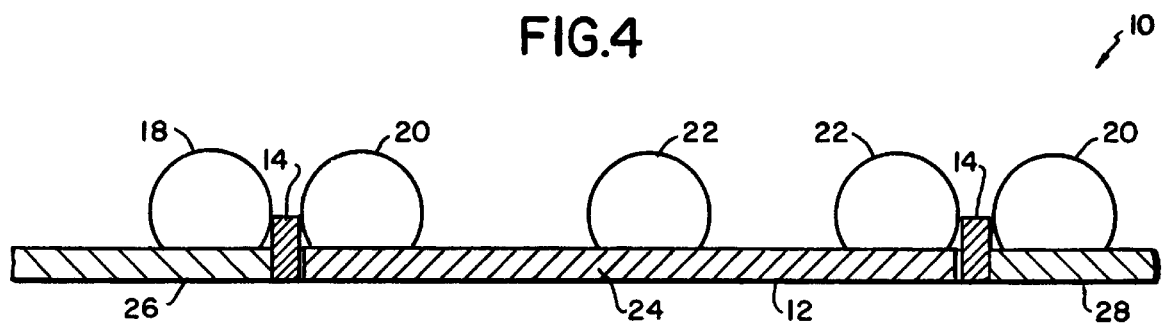
FIG. 4 is a schematic showing a side view of microcapsules following exposure and application of predetermined force, showing barriers limiting the flow of the dye.

FIG. 3 shows a cross-section of a substrate 10, with a surface 12 with a physical barrier 14 and a coating of developer 16 looking from the narrow edge of a rectangular series of cells defined by the physical barrier 14. On the developer coating is an admixture of balls, formed by mixing each of the primary colors 18, 20, and 22 and is applied to the substrate resulting in each primary color bead being randomly distributed in each of the wells, formed by the initial mask step. The substrate is exposed using a master color filter as an optical mask, which is carefully aligned with the alignment marks of the substrate. Following exposure (FIG. 4), pressure is applied to break the unexposed balls (20 in the left cell, 18 in the center cell and 22 on the right cell) and allow the monomer, dye precursor and initiator to mix with the developer solution to form a permanent color filter 24, 26 and 28, corresponding to the dye color in 18, 20 and 22 respectively.

Exposure is more preferably accomplished by a sequential process of three exposures—each corresponding exactly with the absorption band of a glass sphere, thereby eliminating cross-talk between two colors and maintaining the highest purity of color possible (although more alignment steps are required). Furthermore, it is desirable to saturate the final color—this can be controlled by the concentration of dye in the beads initially.

The final structure will comprise—a series of physical barriers comprised of chromium oxide or an opaque black matrix arranged in such a manner to create a series of individual cells; a series of clear, unbroken glass balls in the regions defined by the physical barrier; a colored, resin filling the region defined by the physical barrier and surrounding the clear glass balls; fragments of broken glass balls.

It should be noted that the balls do not necessarily have to be made from glass, any brittle materials that will break under a controlled pressure are suitable.

Thus, while there have been shown and described and pointed out fundamental novel features of the invention as applied to currently preferred embodiments thereof, it will be understood that various omissions and substitutions and changes in the form and details of the method and apparatus illustrated, and in their operation, may be made by those skilled in the art without departing from the spirit of the invention. In addition it is to be understood that the drawings are not necessarily drawn to scale but that they are merely conceptual in nature. It is the intention, therefore, to be limited only as indicated by the scope of the claims appended herewith.

What we claim and desire to protect by Letters Patent is:

1. A color filter suitable for use in a display wherein said filter comprises a plurality of defined cells, wherein each cell is of predetermined color, made up of an admixture of a dye, glass fragments and a matrix material having a thickness, and wherein said plurality of cells are separated from one another by a barrier, said barrier being at least equal to or higher than the thickness of said admixture, or both.

* * * * *